C. & F. E. Holmes,
Dressing Hides.
No. 103,463.      Patented May 24, 1870.

Witnesses          Charles Holmes & Frank E. Holmes,
by their attorney,

United States Patent Office.

CHARLES HOLMES AND FRANK E. HOLMES, OF BOSTON, MASSACHUSETTS.

Letters Patent No. 103,463, dated May 24, 1870.

IMPROVEMENT IN MACHINERY FOR SCOURING OR DRESSING HIDES.

The Schedule referred to in these Letters Patent and making part of the same.

*To all persons to whom these presents may come:*

Be it known that we, CHARLES HOLMES and FRANK E. HOLMES, of Boston, in the county of Suffolk and State of Massachusetts, have made a new and useful invention having reference to Machinery for Scouring or Dressing Hides or Leather; and do hereby declare the same to be fully described as follows, reference being had to the accompanying drawing forming part of our specification, and of which—

Figure 1:
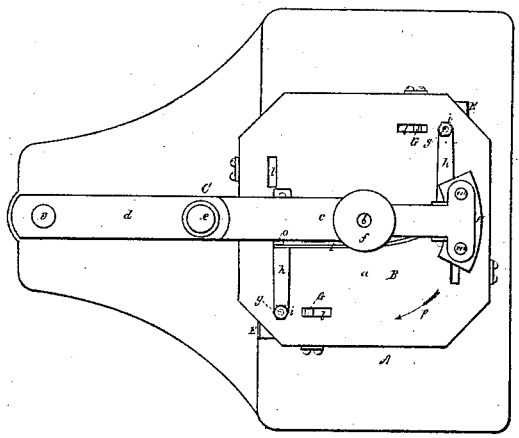
Figure 2:
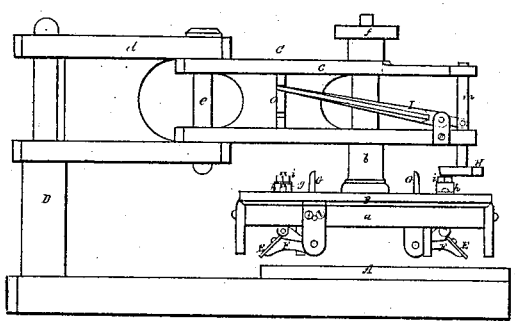

Figure 1 denotes a top view;

Figure 2, a side elevation; and

Figure 3:
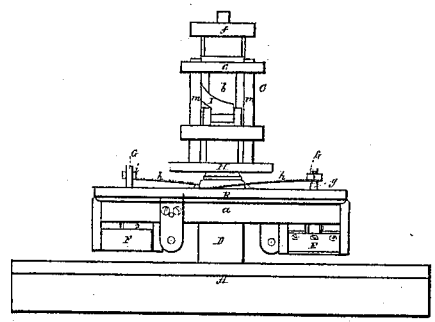

Figure 3, a front elevation of our improved machine.

In our said machines the scrapers or tools have circular motions over the table, and are raised and lowered at intervals while in motion. The rotary tool-supporter is also capable, with the tools, of being moved in any direction in a horizontal plane, in order to bring the tools into action on the various parts of a hide or skin while on the table, such table being stationary.

In most, if not in all other machines for like purposes, the table is movable under the tools, the latter having reciprocating motions attached to them.

In the drawing—

A denotes the stationary table or bed for the skin or hide to rest on.

Over this table is the rotary tool-supporter B, which consists of a horizontal frame or tool-carrier, $a$, and a vertical shaft or arbor, $b$, the frame $a$ being fixed to the lower end of such shaft.

This shaft is supported in suitable bearings in a horizontal arm, C, composed of two parts, $c$ $d$, pivoted or hinged together, as shown at $e$. The portion $c$, which directly sustains the shaft $b$, may be termed the "radius," and the part $d$ may be called the "humerus."

The said arm C swings horizontally on a post, D, arranged as represented.

For revolving the tool-supporter B, there may be a band-wheel or pulley, $f$, fixed on the upper part of the shaft $b$. About the said pulley, and another, at the joint of the arm, an endless belt may be carried.

Another endless belt may go around the pulley at the end joint, and also around another or driving-pulley arranged on the top of the post to which the arm is pivoted.

Such a system of endless belts and pulleys will serve to put the tool-supporter in revolution and keep it so, while it may be moved laterally or longitudinally or obliquely over the table, as circumstances may require.

The tools are represented at E E. There may be one or more of them to the supporter, each tool being fixed to an arm, F, which is pivoted to the supporter so as to move vertically in the arc of a circle.

Figure 4:
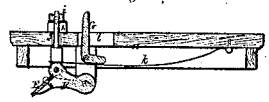

Figure 4 is a vertical section taken through the tool-arm, the rotary supporter, and the lower actuating spring of the said arm.

Each arm has a lifter-rod, $g$, pivoted to it. This rod extends up through the rotary supporter B, and the free end of a spring, $h$, fixed on top of such supporter, the rod being held in connection with the spring by a nut, $i$, screwed on the rod.

Furthermore, to the under side of the supporter another such spring, $k$, is fixed, its free end resting on the arm F.

A bent lever, G, pivoted to the supporter, and arranged in a slot, $l$, formed therein, in manner as represented, is disposed immediately over, and has its lower or shorter arm in contact with the upper side of the spring, the whole being as represented in the drawing.

A cam, H, formed as exhibited in figs. 1, 2, and 3, is employed to trip or actuate each of the levers G, during each revolution of the supporter B.

This cam is sustained by two slide rods $m$ $m$, which are arranged in the radius $o$ of the arm C.

A lever, I, pivoted to the said rods, and the radius $c$, serves to effect a vertical movement of the cam. The longer arm of this lever, by being sprung into either of the two notches in a holder $o$, fixed to the radius or arranged thereon, as represented, serves to retain the cam in either of its extreme positions.

The direction of rotary motion of the supporter B, is indicated by the arrow $p$ placed thereon.

While the supporter B is in revolution, the levers G, in succession, will be carried against the cam, and be moved thereby so as to depress the spring under the lever, and as a consequence, cause such spring to depress the tool-arm, which will be kept depressed until the lever may have passed beyond the cam.

Immediately after the lever may have so passed the cam, the elevating-spring $h$ will operate to raise the tool-arm upward, in a manner to lift the tool off the table, or the skin thereon.

The object of thus lifting each tool is to prevent it from catching or striking against the edge of the hide or skin, so as to raise or lift the hide off the table.

We claim as our invention the following, viz:

The combination of the rotary tool-supporter B, and mechanism, substantially as described, for operating each of the tools thereof in manner as explained, such mechanism consisting of the cam H, the lever G, the springs $h$ and K, and the arm F, arranged and applied together as set forth.

Also, the combination and arrangement of the supporting arm C, (composed of the two parts, viz: the radius c, and the humerus d, applied together as described,) with the rotary tool-supporter B and mechanism, substantially as set forth, for operating each of the tools in manner as explained.

Also, the combination and arrangement of the stationary bed or table A, the jointed arm C, and the rotary tool-supporter B, applied to such arm in manner, and provided with tool-operating mechanism substantially as described.

CHARLES HOLMES.
FRANK E. HOLMES.

Witnesses:
R. H. EDDY,
J. R. SNOW.